G. V. TALLON.
PACIFIER.
APPLICATION FILED MAY 29, 1917.
1,235,169.
Patented July 31, 1917.
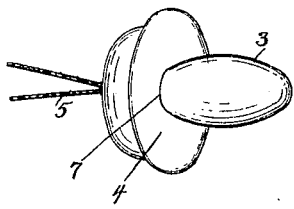
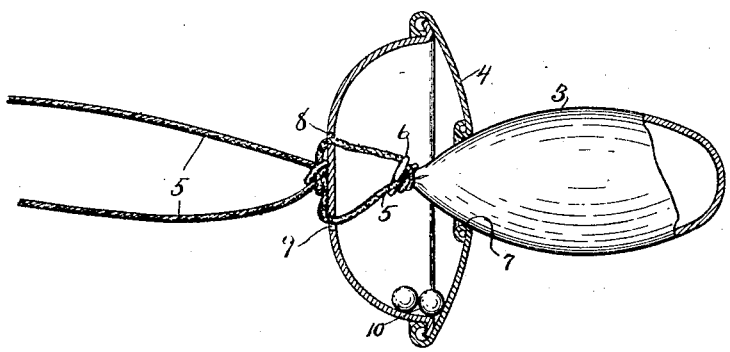
Inventor
George V Tallon
by Seymour & Earle
attys.

UNITED STATES PATENT OFFICE.

GEORGE V. TALLON, OF NEW HAVEN, CONNECTICUT.

PACIFIER.

1,235,169.  Specification of Letters Patent.  Patented July 31, 1917.

Application filed May 29, 1917.  Serial No. 171,683.

*To all whom it may concern:*

Be it known that I, GEORGE V. TALLON, a subject of the King of Great Britain, residing at New Haven, in the county of New Haven and State of Connecticut, have invented a new and useful Improvement in Pacifiers; and I do hereby declare the following, when taken in connection with the accompanying drawings and the characters of reference marked thereon, to be a full, clear, and exact description of the same, and which said drawings constitute part of this application, and represent, in—

Figure 1 a perspective view of a pacifier constructed in accordance with my invention.

Fig. 2 an enlarged sectional view of the same.

This invention relates to an improvement in pacifiers or soothing nipples for babies. Most devices of this character consist of a nipple with a disk connected with the nipple to prevent a child from swallowing it.

The object of this invention is to provide a holder for the nipple and to utilize that holder as a rattle; and the invention consists in a pacifier having certain details of construction as will be hereinafter described and particularly recited in the claim.

In carrying out my invention I employ the usual rubber nipple 3 which may be inflated or filled with any suitable material, and a box 4 preferably formed from celluloid. The nipple after being inflated or filled has its open end closed by tying it with a cord 5 the ends of which and the end 6 of the nipple are passed through an opening 7 in one side of the box, and the ends of the cord passed through holes 8 and 9 in the opposite side of the box outside of which the ends of the cord are tied together. The cord is drawn taut before tying so that the nipple is drawn against the box and thereby expanded. The sides of the box may be interlocked so as not to be readily detachable, and preferably and as herein shown, I place one or more beads or balls 10 which, when the box is shaken, will form a rattle.

I claim:—

A pacifier comprising a box formed on one side with a centrally arranged opening and on the opposite side with two holes, a nipple expanded and tied by a cord, the end of the nipple inserted through said opening and the ends of the cord passed through the holes and tied outside the box, whereby the nipple is held in close engagement with the box.

In testimony whereof, I have signed this specification in the presence of two subscribing witnesses.

GEORGE V. TALLON.

Witnesses:
 FREDERIC C. EARLE,
 C. L. WEED.

Copies of this patent may be obtained for five cents each, by addressing the "Commissioner of Patents, Washington, D. C."